UNITED STATES PATENT OFFICE.

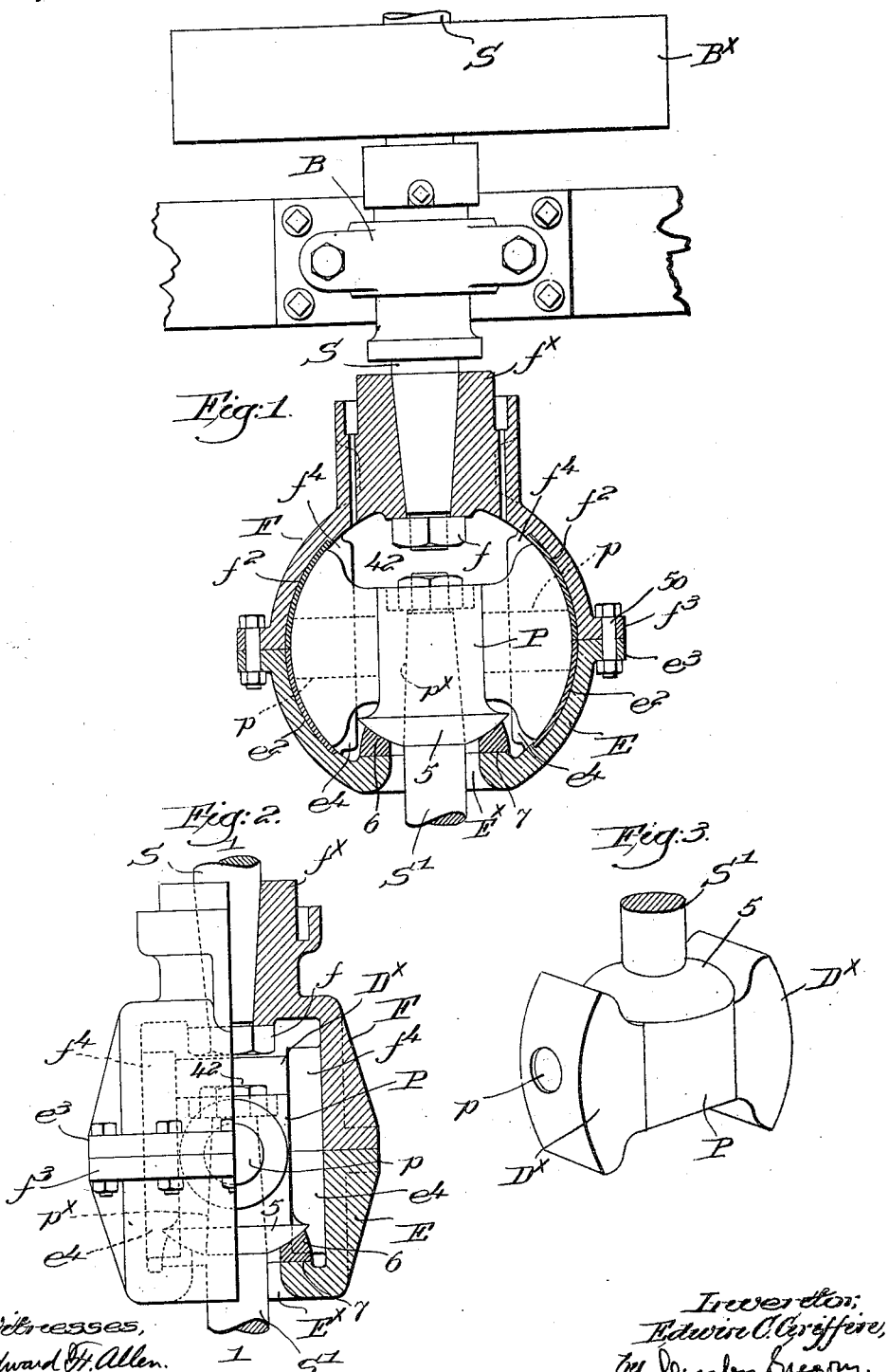

EDWIN C. GRIFFIN, OF NEWTON, MASSACHUSETTS.

SHAFT-COUPLING.

No. 922,579.   Specification of Letters Patent.   Patented May 25, 1909.

Application filed September 2, 1908. Serial No. 451,372.

*To all whom it may concern:*

Be it known that I, EDWIN C. GRIFFIN, a subject of the King of Great Britain, residing at Newton, county of Middlesex, and State of Massachusetts, have invented an Improvement in Shaft-Couplings, of which the following description, in connection with the accompanying drawing, is a specification, like letters on the drawing representing like parts.

In my United States Patent No. 721035, granted to me February 17, 1903 a very strong and durable coupling device is shown, so constructed and arranged that two rotating members or shafts can be thereby connected in such manner that one member may move into or out of alinement with the other member.

My present invention relates more particularly to the second form of the coupling shown and described in said patent, and is an improvement thereover particularly designed for use in cases wherein there is present a strong tendency to separate the two rotating members connected by the coupling. This longitudinal or axial thrust at times binds or cramps the segmental members (forming a part of the coupling) on their concave bearing seats, owing to the excessive friction produced, and interferes with the full freedom of operation of the coupling in its flexibility or universality of movement. In my present invention I have provided, in a coupling of the type above referred to, means to take up such longitudinal thrust independently of the segmental members and their bearings, so that there will be no binding or cramping of the said parts, my improved coupling being particularly adapted for use in grinding mills wherein a heavy grinding roll is carried by a gyratory shaft suspended at its upper end. The weight of the roll, and its gyrations within the grinding chamber, exert a heavy strain on the coupling connecting the roll-shaft with the driving shaft, and by my present invention this strain, which is longitudinal of the roll-shaft, is taken up and provided for.

The various novel features of my invention will be fully described in the subjoined specification and particularly pointed out in the following claims.

Figure 1 is a view partly in vertical section, on the line 1—1, Fig. 2, of a coupling device embodying my present invention, the shafts connected by the coupling being partly shown and in elevation; Fig. 2 is an elevation, part in section of the coupling, the nearer segment being omitted; Fig. 3 is a perspective view of the transmitting members of the coupling and their connection with the depending or driven shaft, but turned upside down.

Referring to Fig. 1 the driving member or shaft S is shown as supported in a vertical position by a suitable fixed bearing B and provided with a pulley $B^\times$ by means of which rotation is transmitted to the shaft, from any suitable source of power, not shown. The lower end of the shaft is tapered to enter a correspondingly tapered hub $f^\times$ of the part F of the two-part inclosing member E, F of the coupling, a nut $f$ retaining the shaft end securely in place. The cross-head P having opposite trunnions $p$, the segmental transmitting members $D^\times$ pivotally mounted thereon, said cross-head having a tapered hole $p^\times$ to receive the correspondingly tapered end of the driven shaft S′, the retaining nut 42; the bearing-seats formed in the inclosing member E, F of the coupling, comprising the concave portions $e^2$, $f^2$ of the same curvature as the convex faces of the segments $D^\times$, and the cheeks $e^4$, $f^4$ on each side of said concave portions, to receive between them the segments, may be and are all substantially as shown in the second form of the coupling embodied in my patent referred to. The parts E and F of the inclosing member are rigidly connected by bolts 50 extended through flanges $e^3$, $f^3$, and the part E has an opening $E^\times$ through which the shaft S′ extends and within which it is freely movable to swing laterally into or out of alinement with the shaft S, but it will be noted by reference to Fig. 6 of the drawing of my said patent that herein I have reversed the position of the parts E and F. The seat portions $e^2$, $f^2$ and the cheeks may be babbitted as in the patent, and so far as described the present coupling is practically identical with the one patented by me.

Referring to Fig. 1 it will be seen that any downward pull or thrust along the shaft S′, due to its weight or to the weight of any parts mounted thereon, will draw the curved faces of the segments hard upon the curved portions of the bearing seats, and in mill work, where heavy, sudden and constantly changing strains are present there is a tendency for the segments to bind or cramp in their bearings in the inclosing member E, F, interfering with the flexibility of the coupling and unduly increasing wear and tear. To obviate this I have herein provided a thrust or suspension bearing for the depending shaft S', which operates independently of the bearings for the segmental transmitting members $D^\times$ and relieves the same from taking up longitudinal thrust or vertically supporting the shaft S'. This auxiliary or thrust bearing is herein shown as comprising a spherical enlargement 5, preferably a part of the cross-head P, formed on its under side concentric with the shaft axis, and a cup-like ring bearing or socket member 6 coöperating therewith and resting on an annular, flat support 7 within the part E concentric with the opening $E^\times$ and in a plane at right angles to the axis of the overhead shaft S. A species of ball-and-socket bearing is thus provided, which takes up the longitudinal thrust or strain of the shaft S' and vertically sustains the latter, while permitting its freedom of movement with relation to the shaft S, the surface of the member 5 being concentric to the convex faces of the segments $D^\times$.

The ring bearing or socket member 6 is free to move laterally on the flat, annular support 7 in order that it may adjust itself to changes in angular position of the shaft S' without any binding tendency.

It is not necessary that the thrust bearing should take up the entire weight of the shaft S' and the parts carried thereby, but a sufficient amount of such weight is taken up to prevent any binding of the bearings and segments of the main portions of the coupling.

Having fully described my invention, what I claim as new and desire to secure by Letters Patent is:—

1. A driving shaft, a shaft to be driven, and a universal coupling therebetween, comprising oppositely-extended trunnions rigidly attached to one shaft, transmitting segments pivotally mounted on the trunnions, a bearing member rigidly secured to the other shaft and having seats to coöperate with the segments, each seat having radially-disposed, parallel faces and a convex face, to coöperate respectively with the sides and convex portion of a segment, and separate means to take up axial thrust of the segment-carrying shaft independently of the coöperation of said segments and their seats.

2. A driving-shaft, a shaft to be driven, and a universal coupling therebetween, comprising oppositely-extended trunnions rigidly attached to one shaft, transmitting segments pivotally mounted on the trunnions, a bearing member rigidly secured to the other shaft and having seats to coöperate with the segments, each seat having radially-disposed, parallel faces and a convex face, to coöperate respectively with the sides and convex portion of a segment, a spherical enlargement on and concentric with the segment-carrying shaft, and an annular socket-bearing therefor on the bearing member, to take up axial thrust of the last named shaft and prevent binding of the segments in their seats.

3. In a universal coupling, a rotatable member having opposite concave bearings radially disposed with relation to its axis of rotation, oppositely-located segments coöperating with and bodily movable upon said bearings, a second rotatable member upon which said segments are mounted to rotate bodily therewith and movable relatively thereto on axes radial to its longitudinal axis, an independent bearing concentric with and to take up longitudinal thrust of the second named rotatable member, and means to prevent relative rotative movement of the two rotatable members.

4. In a universal coupling for adjacent rotatable shafts, oppositely-located segments mounted upon and rotating bodily with one shaft, and relatively movable on axes radial to the shaft, a coöperating inclosing member fixedly mounted on the adjacent shaft and provided with opposite, radially disposed bearing-seats having concave portions concentric with and to sustain the convex faces of the segments, said inclosing member having an opening through which the segment carrying shaft freely extends, a laterally movable, annular bearing surrounding the shaft and sustained by the inclosing member adjacent said opening, and a spherical enlargement on the shaft coöperating with said bearing, to take up axial thrust of the shaft.

5. A rotatable driving member, an adjacent, depending shaft to be driven, and a coupling between them, comprising an inclosing member fixedly connected with the driving member and having an opening through which the adjacent shaft end freely extends, radially disposed bearing-seats on said inclosing member, transmitting segments engaging and coöperating with said seats and mounted on the shaft and relatively movable on axes radial to the shaft, and means to suspend the shaft and sustain its weight independently of the bearing seats while permitting free angular movement of said shaft.

6. A vertical driving member having fixed bearings, a depending shaft to be driven, a universal coupling therebetween, including transmitting members on the driven shaft and an inclosing member having coöperating bearings therefor, said members and their coöperating bearings effecting simultaneous rotation of the shafts and also vertically sustaining the driven shaft, said inclosing member being mounted on the driving member, and a suspension bearing for the driven shaft, on said inclosing member and vertically sustaining the driven shaft independently of the transmitting members and their bearings, to prevent binding of said members on their bearings.

7. A vertical driving shaft having fixed bearings, a coupling member fixedly connected therewith and having an opening in its bottom, bearings in said member, a depending shaft to be driven, having its upper end extended through the opening into said coupling member, transmitting segments mounted on the driven shaft and coöperating with said bearings to effect simultaneous rotation of the shafts while permitting the driven shaft to swing, a spherical enlargement on the latter shaft, and an annular socket bearing therefor surrounding the shaft and laterally movable in the coupling member adjacent its opening, to vertically sustain the driven shaft independently of the segments and their bearings.

8. A driving shaft having fixed bearings, a depending shaft to be driven, a universal coupling therebetween, including an inclosing bearing member rigidly attached to the driving shaft and having an opening through which the driven shaft extends, an annular, internal seat surrounding the opening and in a plane at right angles to the axis of the driving shaft, a cup-like bearing ring supported by and laterally movable on said seat, and a spherical portion fast on the depending shaft and coöperating with the ring, to form a suspension bearing for the depending shaft and take up longitudinal thrust.

In testimony whereof, I have signed my name to this specification, in the presence of two subscribing witnesses.

EDWIN C. GRIFFIN.

Witnesses:
JOHN C. EDWARDS,
THOMAS J. DRUMMOND.